Sept. 12, 1950　　　C. A. SCHILD ET AL　　　2,522,238
MACHINE FOR PRODUCING LAMINATED CORE STRUCTURES
Filed April 21, 1948
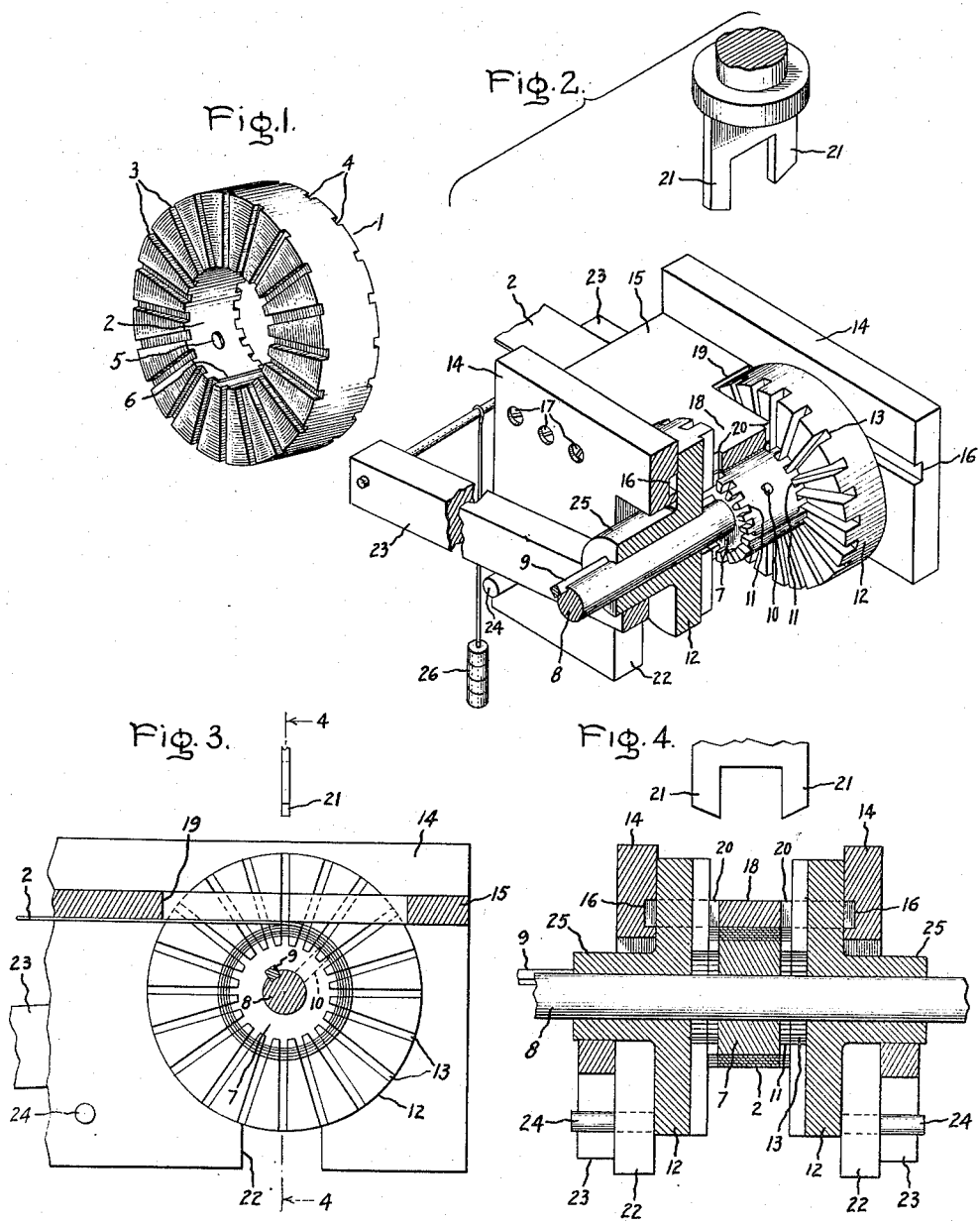
Inventors:
Charles A. Schild,
Glenn D. Stapleton,
by Crowell P. Mack
Their Attorney.

Patented Sept. 12, 1950

2,522,238

UNITED STATES PATENT OFFICE 2,522,238

MACHINE FOR PRODUCING LAMINATED CORE STRUCTURES

Charles A. Schild and Glenn D. Stapleton, Fort Wayne, Ind., assignors to General Electric Company, a corporation of New York Application April 21, 1948, Serial No. 22,378

13 Claims. (Cl. 164—87)

This invention relates to an improved machine and method for forming disc type core structures. More specifically, this invention contemplates an improved method and apparatus for producing slotted, laminated core structures of the disc type having winding slots disposed in the transverse faces of the core.

In the manufacture of disc type laminated core structures, as used for instance in axial gap dynamoelectric machines, the core is customarily formed by winding a relatively thin strip of magnetic material into a tight coil. The design of such cores frequently requires the provision of straight radial winding slots in the transverse faces. These slots may be individually milled in each core, however, it is desirable to provide means for punching notches in the strip during the winding operation which form the slots in the completed assembly. The problem is complicated by the fact that the core structure is substantially a true helix and, therefore, each successive notch must be spaced a greater distance from the preceding notch in order to obtain proper alignment of the slots.

An object of this invention is to provide an improved mechanism for producing slotted laminated cores of the disc type.

Another object of this invention is to provide an improved method for producing slotted laminated core assemblies of the disc type.

A further object of this invention is to provide an improved method for producing slotted laminated core assemblies of the disc type formed from a coiled strip of core forming material wherein the notches in the strip which provide the resultant slots in the completed assembly are punched during the winding operation.

A still further object of this invention is to provide an improved method for punching the slots of disc type laminated core assemblies formed from a coiled strip of core forming material during the winding operation.

Further objects and advantages of this invention will become apparent and the invention will be better understood by reference to the following description and the accompanying drawing. The features of novelty which characterize this invention will be pointed out with particularity in the claims annexed to and forming a part of this specification.

In accordance with this invention, the strip which forms the core is wound on a rotatable member having a plurality of grooves formed around the periphery of its transverse faces. These grooves serve as dies for punching notches in the edges of the first layer of the strip as it is being wound, the punching operation preferably taking place substantially at the point of tangency of the strip with the rotatable member. After the first layer has been wound and punched, the punching and winding operation continues with the notches already formed in the preceding layers serving as dies for the layer being wound. When the core has been wound to the desired thickness, the notches which have been punched in the edges of the strip as it is being wound are in alignment forming the winding slots in the transverse faces of the core.

In the drawing, Fig. 1 is a view in perspective illustrating a finished core produced by the method and apparatus of this invention; Fig. 2 is a perspective view, partly in section, illustrating the improved apparatus for producing the core of Fig. 1; Fig. 3 is a side cross sectional view of the mechanism of Fig. 2; and Fig. 4 is a cross sectional view taken along the line 4—4 of Fig. 3.

Referring now to Fig. 1, there is shown a disc type, slotted laminated core 1 of the type used in axial gap dynamoelectric machines. This core is formed from a tightly coiled strip 2 of relatively thin, magnetic, core forming material and is provided with a plurality of straight radial winding slots 3 and 4 formed in both transverse faces. An opening 5 is formed near the inner end 6 of the strip, the function of which will be hereinafter described. It can be readily seen that the strip 2 after winding is substantially a true helix and, therefore, the notches in its edges which form the resultant winding slots are not equally spaced, each successive notch being spaced a greater distance from the preceding notch. In order to punch the notches in the edges of the strip 2 as it is being wound and to secure alignment of these notches in the finished core to produce the desired straight radial slots, the method and apparatus now to be described is provided.

Referring now to Figs. 2, 3 and 4, there is shown the apparatus used to produce the core of Fig. 1. In order to produce a tightly coiled core structure, the strip 2 is wound on a rotatable die member 7. This member may be formed as a true helix, the amount of eccentricity corresponding to the thickness of the strip 2. The rotatable member 7 is adapted to be rotated by shaft 8 and is secured thereto by suitable means such as a key 9. A loose pin 10 is positioned in a suitable opening in the rotatable member 7 and is adapted, when the shaft 8 is positioned in the opening of the rotatable member 7 to project slightly beyond the periphery thereof. The pin 10 mates with the opening 6 in strip 2 and serves to hold the strip on the rotatable member 7 for winding. The rotatable member is provided with a plurality of straight radial punch receiving grooves 11 in the peripherial edge of both its transverse faces, these grooves corresponding in number to the number of slots desired to be formed in the core. Two guide plates 12 are secured to the shaft 8 by the key 9 and are rotatable therewith. These plates abut the rotatable member 7 and are provided with a plurality of straight radial punch guiding grooves 13 in their inner transverse faces in alignment with the punch receiving grooves 11 of the rotatable member 7. The plates 12 guide the strip 2 as it is being wound so that a uniform coil is obtained.

The rotatable member, guide plate, and shaft assembly is adapted for floating movement, i. e., for both rotation and vertical movement, in a fixed frame assembly comprising side members 14 and a pressure applying member 15. The pressure applying member 15 is seated in milled slots 16 in the inner sides of the members 14 and is affixed thereto by suitable means such as screws 17. The pressure applying member 15 has a central portion 18 interposed between the guide members 12, which portion forms with the members 14 openings 19 through which the guide members project. The central portion 18 is provided with two punch receiving grooves 20 in alignment with the punch guiding grooves 13 of the guide plates 12 and punch receiving grooves 11 of the rotatable member 7. The fixed frame assembly is adapted to be secured in a suitable punch press and punches 21, with the central portion 18 interposed therebetween, are operable by the press and adapted for movement in the slots 11, 13 and 20.

Considering now the operation of the device described above, the strip 2 is fed to the rotatable member 7 from a coil (not shown) and is secured thereto by the pin 10, the end of the strip being seated against the eccentric portion of the helical rotatable member. As the shaft 8 is rotated, the strip 2 is coiled on the rotatable member 7, being guided into a uniform coil by the guide plates 12. As the first layer of the strip is being wound on the rotatable member, the punches 21, moving in the slots 13 of the guide members 12 and the slots 20 of the central portion 18, punch notches in both edges of the strip using the grooves 11 of the rotatable member 7 as dies. The punching operation is preferably performed at substantially the point of tangency of the strip 2 with the rotatable member 7. The shaft 8 can be rotated manually to bring each successive group of slots 11 and 13 in alignment with the slots 20 so that the next notches can be punched. It may, however, be desirable to provide suitable indexing means for rotating the shaft 8 the proper amount for each punching operation. It can now be readily seen that when one complete layer of the strip 2 has been coiled on the rotatable member 7, a plurality of notches will have been punched in both edges of the strip using the grooves 11 as dies. The winding and punching operation is then continued, however, the notches in the next layer and each succeeding layer being punched using the notches already punched in the preceding layer or layers as dies.

Since the fixed frame assembly is secured in the punch press, it is necessary that the rotatable member and guide plate assembly be adapted for vertical movement as the thickness of the coil being wound on the rotatable member increases. Slots 22 are therefore provided in the members 14 which permit vertical movement of this assembly. Arms 23, which pivot around pins 24 in the side member 14, bear against the hubs 25 of the guide plates 12 and exert a force thereon by virtue of weight 26 which forces the rotatable member 7 and the coil wound thereon against the central portion 18 of the pressure applying member 15. With this assembly the coil, regardless of the number of layers wound thereon, always bears against the pressure applying member and there is thus provided a resisting force to resist the punching pressure. Furthermore, as the coil wound on the rotatable member 7 becomes larger in diameter, the die assembly is moved away from the pressure applying member and the penetration of the punches 21 by virtue of the central portion 18, which is interposed therebetween, remains constant. Due to the constant penetration of the punches 21 the chips will be left in the slots already formed.

When the desired thickness of the core has been obtained the pressure assembly comprising the arms 23 and the weight 26 is removed and the fixed frame assembly removed from the punch press. The rotatable member and guide plate assembly is then removed from the frame assembly through the slots 22, key 9 removed and the shaft 8 and guide plates 12 removed. With the removal of the shaft 8, the pin 10 will fall away from the strip 2 and the coiled and punched core can be removed from the rotatable member 7.

To summarize there is here provided a method for forming a disc type slotted laminated core assembly in which a relatively thin strip of core forming material is wound on a rotatable member provided with punch receiving grooves, notches are punched in the edges of the first layer of the strip as it is being wound using the punch receiving grooves as dies, and notches are punched in the succeeding layers using the notches already punched in the preceding layers as dies. In this way, it is possible to obtain uniform aligned slots in a disc type core with the punching operation being performed by means of a simple mechanism while the core is being wound. Since the grooves in the rotatable member which form the dies for punching the first layer are used only once in the production of each core, economies are effected in the use of dies since maximum die life and low maintenance is obtained. Furthermore, accurate registration of the notches which form the slots is assured and the completed core structure comes out of the press ready for insulation and winding.

While there is illustrated and described a specific embodiment and method of this invention, further embodiments and methods will occur to those skilled in the art. It is desired that it be understood, therefore, that this invention is not limited to the embodiment and method described and it is intended in the appended claims to cover all modifications which do not depart from the spirit and scope of this invention.

What we claim as new and desire to secure by Letters Patent of the United States is:

1. In a machine for producing slotted laminated core structures from a continuous strip of core forming material, means for winding said strip into a tight coil to form a laminated core, and punching means for forming notches in said strip as it is wound on said coil, said winding means having a plurality of die means cooperating with said punching means for forming a plurality of notches in the first layer of said coil as it is being wound, the notches of said first layer and each succeeding layer forming dies for punching notches in the next layer being wound whereby said notches in the finished core are respectively in alignment forming slots in said core.

2. In a machine for producing disc-type slotted laminated core structures from a continuous strip of core forming material, a rotatable member adapted to have said strip coiled thereon and having a plurality of punch receiving grooves formed in an edge thereof corresponding to the number of slots to be formed in said core, means for rotating said rotatable member whereby said strip is wound thereon, and punch means adapted for movement in said grooves for forming notches in an edge of said strip as it is being wound, said grooves forming dies cooperating with said punch means for forming a plurality of notches in an edge of the first layer of said coil as it is being wound on said rotatable member, said notches in said first layer and each succeeding layer forming dies for punching the next layer being wound whereby said notches in the finished core are respectively in alignment forming slots in said core.

3. In a machine for producing disc-type slotted laminated core structures from a continuous strip of core forming material, a rotatable member adapted to have said strip coiled thereon and having a plurality of punch receiving grooves formed in an edge thereof corresponding to the number of slots to be formed in said core, means for securing the end of said strip to said rotatable member, means for rotating said rotatable member whereby said strip is wound thereon, and punch means adapted for movement in said grooves for forming notches in an edge of said strip as it is being wound, said grooves forming dies cooperating with said punch means for forming a plurality of notches in an edge of the first layer of said coil as it is being wound on said rotatable member, said notches in said first layer and each succeeding layer forming dies for punching the next layer being wound whereby said notches in the finished core are respectively in alignment forming slots in said core.

4. In a machine for producing disc-type slotted laminated core structures from a continuous strip of core forming material, a rotatable member having an outer helical surface adapted to have said strip coiled thereon and having a plurality of punch receiving grooves formed in an edge thereof corresponding to the number of slots to be formed in said core, means for rotating said rotatable member whereby said strip is wound thereon, and punch means adapted for movement in said grooves for forming notches in an edge of said strip as it is being wound, said grooves forming dies cooperating with said punch means for forming a plurality of notches in an edge of the first layer of said coil as it is being wound on said rotatable member, said notches in said first layer and each succeeding layer forming dies for punching the next layer being wound whereby said notches in the finished core are respectively in alignment forming slots in said core.

5. In a machine for producing disc-type slotted laminated core structures from a continuous strip of core forming material, a rotatable member adapted to have said strip coiled thereon and having a plurality of radial punch receiving grooves formed in an edge thereof corresponding to the number of slots to be formed in said core, means for rotating said rotatable member whereby said strip is wound thereon, and punch means adapted for movement in said grooves for forming notches in an edge of said strip as it is being wound, said grooves forming dies cooperating with said punch for forming a plurality of notches in an edge of the first layer of said coil as it is being wound on said rotatable member, said notches in said first layer and each succeeding layer forming dies for punching the next layer being wound whereby said notches in the finished core are respectively in radial alignment forming slots in said core.

6. In a machine for producing disc-type slotted laminated core structures from a continuous strip of core forming material, a rotatable member adapted to have said strip coiled thereon and having a plurality of punch receiving grooves formed in an edge thereof corresponding to the number of slots to be formed in said core, guide means adjacent said rotatable member and rotatable therewith for guiding said strip as it is wound on said rotatable member whereby a uniform coil is obtained, said guide means having a plurality of punch guiding grooves formed therein in alignment with said punch receiving grooves of said rotatable member, means for rotating said rotatable member whereby said strip is wound thereon, and punch means adapted for movement in said punch guiding and said punch receiving grooves for forming notches in an edge of said strip as it is being wound, said punch receiving grooves forming dies for punching a plurality of notches in the first layer of said coil as it is being wound, said notches in said first layer and each succeeding layer forming dies for punching the next layer being wound whereby said notches in the finished core are respectively in alignment forming slots in said core.

7. In a machine for producing disc-type slotted laminated core structures from a continuous strip of core forming material, a rotatable member adapted to have said strip coiled thereon and having a plurality of radial punch receiving grooves formed in an edge thereof corresponding to the number of slots to be formed in said core, guide means adjacent said rotatable member and rotatable therewith for guiding said strip as it is wound on said rotatable member whereby a uniform coil is obtained, said guide means having a plurality of radial punch guiding grooves formed therein in alignment with said punch receiving grooves of said rotatable member, means for rotating said rotatable member whereby said strip is wound thereon, and punch means adapted for movement in said punch guiding and said punch receiving grooves for forming notches in an edge of said strip as it is being wound, said punch receiving grooves forming dies for punching a plurality of notches in the first layer of said coil as it is being wound, said notches in said first layer and each succeeding layer forming dies for punching the next layer being wound whereby said notches in the finished core are respectively in radial alignment forming said slots in said core.

8. In a machine for producing disc-type slotted laminated core structures from a continuous strip of core forming material, a rotatable member adapted to have said strip coiled thereon and having a plurality of punch receiving grooves formed in an edge thereof corresponding to the number of slots to be formed in said core, guide means adjacent said rotatable member and rotatable therewith for guiding said strip as it is wound on said rotatable member whereby a uniform coil is obtained, said guide means having a plurality of punch guiding grooves formed therein in alignment with said punch receiving grooves of said rotatable member, means for rotating said rotatable member whereby said strip is wound thereon, punch means adapted for movement in said punch guiding and said punch receiving grooves for forming notches in an edge of said strip as it is being wound, said punch receiving grooves forming dies for punching a plurality of notches in the first layer of said coil as it is being wound, said notches in said first layer and each succeeding layer forming dies for punching the next layer being wound whereby said notches in the finished core are respectively in alignment forming slots in said core, and means bearing against the layer of said coil being wound for maintaining the punch penetration constant regardless of the number of layers in said coil.

9. In a machine for producing disc-type slotted laminated core structures from a continuous strip of core forming material, a rotatable member adapted to have said strip coiled thereon and having a plurality of punch receiving grooves formed in an edge thereof corresponding to the number of slots to be formed in said core, guide means adjacent said rotatable member and rotatable therewith for guiding said strip as it is wound on said rotatable member whereby a uniform coil is obtained, said guide means having a plurality of punch guiding grooves formed therein in alignment with said punch receiving grooves of said rotatable member, means for rotating said rotatable member whereby said strip is wound thereon, punch means adapted for movement in said punch guiding and said punch receiving grooves for forming notches in an edge of said strip as it is being wound, said punch receiving grooves forming dies for punching a plurality of notches in the first layer of said coil as it is being wound, said notches in said first layer and each succeeding layer forming dies for punching the next layer being wound whereby said notches in the finished core are respectively in alignment forming slots in said core, fixed pressure applying means bearing against the layer of said coil being wound for maintaining the punch penetration constant regardless of the number of layers in said coil, and means exerting the pressure on said rotatable member for urging said rotatable member and the layer of said coil being wound toward said pressure applying means.

10. In a machine for producing disc-type slotted laminated core structures from a continuous strip of core forming material, a rotatable member adapted to have said strip coiled thereon and having a plurality of radial punch receiving grooves formed in an edge thereof corresponding to the number of slots to be formed in said core, means for rotating said rotatable member whereby said strip is wound thereon, and punch means adapted for movement in said grooves for forming notches in an edge of said strip as it is being wound, said grooves forming dies cooperating with said punch means for forming a plurality of notches in an edge of the first layer of said coil as it is being wound on said rotatable member, said notches in said first layer and each succeeding layer forming dies for punching the next layer being wound whereby said notches in the finished core are respectively in alignment forming slots in said core, said punch means operating substantially at the point of tangency of said strip with said rotatable member.

11. In a machine for producing disc-type slotted laminated core structures from a continuous strip of core forming material, a rotatable member adapted to have strip coiled thereon and having a plurality of radial punch receiving grooves formed in the outer periphery of both axial sides thereof corresponding to the number of slots to be formed in said core, means for rotating said rotatable member whereby said strip is wound thereon, and punch means adapted for movement in said grooves for forming notches in both edges of said strip as it is being wound, said grooves forming dies cooperating with said punch means for forming a plurality of notches in both edges of the first layer of said coil as it is being wound on said rotatable member, said notches in said first layer and each succeeding layer forming dies for punching the next layer being wound whereby said notches in the finished core are respectively in alignment forming slots in both axial sides of said core.

12. In a machine for producing disc-type slotted laminated core structures from a continuous strip of core forming material, a rotatable member having an outer helical surface adapted to have said strip coiled thereon and having a plurality of radial punch receiving grooves formed in the peripherial edge of both transverse sides thereof corresponding to the number of slots to be formed in said core, the ends of said helical surface of said rotatable member being radially spaced a distance substantially equal to the thickness of said strip, a pair of guide means adjacent each side of said rotatable member and rotatable therewith for guiding said strip as it is wound on said rotatable member whereby a uniform coil is obtained, each of said guide means having a plurality of radial punch guiding grooves in alignment with said punch receiving grooves of said rotatable member, means for securing said strip to said rotatable member, means for rotating said rotatable member whereby said strip is wound thereon, means including two punches respectively adapted for movement in said punch guiding and said punch receiving grooves for forming notches in both edges of said strip as it is being wound, said punch receiving grooves forming dies for punching a plurality of notches in both sides of the first layer of said coil as it is being wound, said notches in said first layer and each succeeding layer forming dies for punching the next layer being wound whereby said notches in the finished core are respectively in alignment forming slots in both sides of said core, fixed pressure applying means interposed between said punches and bearing against the layer of said coil being wound for maintaining the penetration of said punches constant regardless of the number of layers in said coil, and means exerting a pressure on said rotatable member for urging said rotatable member and the layer of said coil being wound toward said pressure applying means, said punches operating substantially at the point of tangency of said strip with said rotatable member.

13. In a machine for producing disc-type slotted laminated core structures from a continuous strip of core forming material, a rotatable member adapted to have said strip coiled thereon and having a plurality of punch receiving grooves formed in the peripherial edge of both transverse sides thereof corresponding to the number of slots to be formed in said core, a pair of guide means adjacent each side of said rotatable member and rotatable therewith for guiding said strip as it is wound on said rotatable member whereby the uniform coil is obtained, each of said guide means having a plurality of punch guiding grooves in alignment with said punch receiving grooves of said rotatable member, means for rotating said rotatable member whereby said strip is wound thereon, means including two punches respectively adapted for movement in said punch guiding and said punch receiving grooves for forming notches in both edges of said strip as it is being wound, said punch receiving grooves forming dies for punching a plurality of notches in both sides of the first layer of said coil as it is being wound, said notches in said first layer and each succeeding layer forming dies for punching the next layer being wound whereby said notches in the finished core are respectively in alignment forming slots in both sides of said core, fixed pressure applying means interposed between said punches and bearing against the layer of said coil being wound for maintaining the penetration of said punches constant regardless of the number of layers in said coil, and means exerting a pressure on said rotatable member for urging said rotatable member and the layer of said coil being wound toward said pressure applying means, said punches operating substantially at the point of tangency of said strip with said rotatable member.

CHARLES A. SCHILD.
GLENN D. STAPLETON.

REFERENCES CITED

The following references are of record in the file of this patent:

UNITED STATES PATENTS

| Number | Name | Date |
| --- | --- | --- |
| 36,106 | Wynne | May 17, 1887 |
| 2,133,350 | Anderson | July 12, 1938 |
| 2,200,425 | Kursteiner | May 14, 1940 |
| 2,357,017 | Miller et al. | Aug. 29, 1944 |

FOREIGN PATENTS

| Number | Country | Date |
| --- | --- | --- |
| 20,333/29 | Australia | May 22, 1930 |